(12) United States Patent
Cho et al.

(10) Patent No.: US 11,951,965 B2
(45) Date of Patent: Apr. 9, 2024

(54) SYSTEM AND METHOD FOR UPGRADING METAMODEL FOR FRICTION COEFFICIENT PREDICTION OF BRAKE PAD, AND BRAKE CONTROL SYSTEM USING THE METAMODEL

(71) Applicants: HYUNDAI MOTOR COMPANY, Seoul (KR); KIA CORPORATION, Seoul (KR)

(72) Inventors: Sung Hyun Cho, Yongin-si (KR); Sung Hoon Bang, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 316 days.

(21) Appl. No.: 17/491,948

(22) Filed: Oct. 1, 2021

(65) Prior Publication Data
US 2022/0363227 A1    Nov. 17, 2022

(30) Foreign Application Priority Data
May 12, 2021 (KR) .................. 10-2021-0061090

(51) Int. Cl.
| B60T 8/172 | (2006.01) |
| B60T 8/171 | (2006.01) |
| B60T 8/58 | (2006.01) |
| B60T 17/22 | (2006.01) |
| G06N 20/00 | (2019.01) |
| F16D 66/00 | (2006.01) |

(52) U.S. Cl.
CPC ............ *B60T 8/172* (2013.01); *B60T 8/171* (2013.01); *B60T 8/58* (2013.01); *B60T 17/221* (2013.01); *G06N 20/00* (2019.01); *F16D 2066/001* (2013.01); *F16D 2066/003* (2013.01); *F16D 2066/005* (2013.01)

(58) Field of Classification Search
CPC ........... B60T 8/172; B60T 8/56; G01N 19/05; G06N 20/00
See application file for complete search history.

(56) References Cited

U.S. PATENT DOCUMENTS

| 7,957,875 | B2 * | 6/2011 | Antanaitis | ............... B60L 50/16 701/1 |
| 10,525,947 | B2 * | 1/2020 | Masuda | ............... B60T 17/221 |

(Continued)

FOREIGN PATENT DOCUMENTS

| CN | 101710062 A | 5/2010 |
| JP | 2003-160046 A | 6/2003 |

(Continued)

*Primary Examiner* — Long T Tran
(74) *Attorney, Agent, or Firm* — Morgan, Lewis & Bockius LLP

(57) ABSTRACT

A system and method includes upgrading a metamodel for friction coefficient prediction of a brake, in which the metamodel for friction coefficient prediction may be constructed using various derivative parameters relating to the speed, temperature and pressure of a brake disc in addition to basic parameters, such as the speed, temperature and pressure of the brake disc, to greatly improve performance and accuracy in friction coefficient prediction using the metamodel for friction coefficient prediction and to improve accuracy in evaluation of the driving performance of a vehicle through an increase in accuracy of determination of brake torque.

17 Claims, 13 Drawing Sheets

(56) References Cited

U.S. PATENT DOCUMENTS

| | | | | |
|---|---|---|---|---|
| 2009/0012686 A1* | 1/2009 | Maeda | ............... | B60T 8/1755 |
| | | | | 701/70 |
| 2009/0187320 A1* | 7/2009 | Antanaitis | ............ | B60L 3/0076 |
| | | | | 701/70 |
| 2017/0297573 A1* | 10/2017 | Fraser | ............... | B60W 30/143 |
| 2019/0107163 A1* | 4/2019 | Medinei | ............... | F16D 66/026 |
| 2021/0383040 A1* | 12/2021 | Cho | ..................... | B60T 17/22 |

FOREIGN PATENT DOCUMENTS

| | | |
|---|---|---|
| KR | 10-1999-0012798 A | 2/1999 |
| KR | 10-2017-0079159 A | 7/2017 |
| KR | 10-2020-0122440 A | 10/2020 |
| WO | 2019/031106 A1 | 2/2019 |

\* cited by examiner

SYSTEM AND METHOD FOR UPGRADING METAMODEL FOR FRICTION COEFFICIENT PREDICTION OF BRAKE PAD, AND BRAKE CONTROL SYSTEM USING THE METAMODEL

CROSS-REFERENCE TO RELATED APPLICATION

The present application claims priority to Korean Patent Application No. 10-2021-0061090 filed on May 12, 2021, the entire contents of which is incorporated herein for all purposes by this reference.

BACKGROUND OF THE INVENTION

Field of the Invention

The present invention relates to a system and method for upgrading a metamodel for friction coefficient prediction of a brake pad. More particularly, it relates to a system and method for upgrading a metamodel for friction coefficient prediction of a brake pad, in which prediction performance and accuracy of the friction coefficient of the brake pad may be greatly improved through machine learning using derivative parameters in addition to basic parameters for predicting the friction coefficient of the brake pad, and a brake control system using the upgraded metamodel for friction coefficient prediction.

Description of Related Art

Among simulations for evaluating the performance of vehicles, a brake simulation of a brake system including friction pieces, such as a brake disc, is performed.

The brake simulation is a process for testing various items, such as brake heat capacity evaluation, braking distance evaluation, race track lab-time evaluation, etc., in addition to basic performance evaluation of a brake.

In general, the hydraulic braking operation of a vehicle includes a process of providing hydraulic pressure to wheel cylinders of calipers, a process of allowing pistons of the wheel cylinders to press brake pads, and a process of causing frictional contact of the brake pads with the surfaces of brake discs rotating together with tires to substantially achieve braking of the vehicle.

Here, the friction coefficient $\mu$ of the brake disc is continuously or nonlinearly changed depending on the rotation speed rad/s, temperature T and pressure S of the brake disc.

That is, the friction coefficient $\mu$ of the brake disc is continuously or nonlinearly changed depending on the rotation speed rad/s of the brake disc according to a vehicle speed, the temperature T of the brake disc, and the magnitude of pressure (hydraulic pressure) P applied to the brake disc from the wheel cylinder and the brake pads.

Therefore, when brake torque is calculated during the brake simulation for evaluating the performance of the brake system of the vehicle, friction coefficient parameters of the brake disc must be accurately reflected to improve accuracy in the brake simulation.

As one example of conventional technologies, a method, in which the friction coefficient $\mu$ of the brake disc is reflected as a constant average value when brake torque for evaluating the performance of the brake system of the vehicle is calculated, is used.

However, when the friction coefficient $\mu$ of the brake disc is reflected as a constant average value (for example, 0.34, 0.38, 0.42 or the like) in calculation of the brake torque, a change in the friction coefficient $\mu$ depending on a driving situation is not reflected, and thus, accuracy in calculation of the brake torque is lowered.

As another example of the conventional technologies, a method, in which, to calculate brake torque for evaluating the performance of the brake system of the vehicle, the friction coefficient $\mu$ depending on the temperature of the brake disc is plotted on map data, the temperature of the brake disc depending on a driving state is calculated, and the friction coefficient corresponding to the calculated temperature is determined from the map data, is used.

However, when the brake torque is calculated, the friction coefficient depending on the temperature of the brake disc may be reflected from the map data, but a change in the friction coefficient in consideration of changes in the rotation speed and the hydraulic pressure of the brake disc occurring simultaneously with a change in the temperature of the brake disc is not reflected, and thus, accuracy in calculation of the brake torque is also lowered.

Consequently, the brake torques calculated by the above-described conventional technologies cause differences with the actual brake torque, and thus, accuracy in results of the brake simulation is lowered.

Therefore, to increase accuracy in the brake simulation, a method, in which brake torque is calculated by reflecting an accurate friction coefficient of a brake disc in consideration of changes in the temperature of the brake disc, the rotation speed of a disc, and brake pressure (hydraulic pressure) influencing a change in the friction coefficient of the brake disc, is required.

For the present purpose, as a method for accurately predicting the friction coefficient, a metamodel for friction coefficient prediction using machine learning is being used.

However, the conventional metamodel for friction coefficient prediction using machine learning may predict a friction coefficient using only basic parameters, such as the speed, temperature and pressure of the brake disc, but has the following problems.

First, a predicted friction coefficient curve is cut at a specific time point and suddenly drop compared to an actual friction coefficient curve, as shown in FIG. 1, or the predicted friction coefficient deviates downwards from the actual friction coefficient in a specific time section, as shown in FIG. 2, and thus, accuracy of the predicted friction coefficient is lowered.

Second, the predicted friction coefficient curve is not continuous and is cut in a specific section compared to the actual friction coefficient curve, as shown in FIG. 3 and FIG. 4, and thus, accuracy of the predicted friction coefficient is lowered.

Third, the predicted friction coefficient greatly deviates from the actual friction coefficient due to noise of raw data or the like, as shown in FIG. 5 and FIG. 6, and thus, accuracy of the predicted friction coefficient is lowered.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for upgrading a metamodel for friction coefficient prediction of a brake pad and a brake control system using the metamodel for friction coefficient prediction, in which the metamodel for friction coefficient prediction may be constructed through machine learning using various derivative parameters relating to the speed, temperature pressure of a brake disc, in addition to basic parameters, such as the speed, temperature and pressure of the brake disc, to greatly improve performance and accuracy in prediction of a friction coefficient using the metamodel for friction coefficient prediction and to improve accuracy in evaluation of the driving performance of a vehicle through an increase in accuracy of determination of brake torque.

Various aspects of the present invention are directed to providing a system for upgrading a metamodel for friction coefficient prediction of a brake pad, the system including a data preprocessor configured to preprocess raw data including a rotation speed, a temperature and a pressure of a brake disc to validate the raw data, a derivative parameter preprocessor configured to generate derivative parameters from basic parameters including the rotation speed, temperature and pressure of the brake disc, output by the data preprocessor, and a machine learning processor configured to generate the metamodel for friction coefficient prediction by performing machine learning based on the derivative parameters output by the derivative parameter preprocessor.

In another aspect, various aspects of the present invention are directed to providing a method for upgrading a metamodel for friction coefficient prediction of a brake pad, the method including preprocessing, by a data preprocessor, raw data including a rotation speed, a temperature and a pressure of a brake disc to validate the raw data, generating, by a derivative parameter preprocessor, derivative parameters from basic parameters including the rotation speed, temperature and pressure of the brake disc, output by the data preprocessor, and generating, by a machine learning processor, the metamodel for friction coefficient prediction by performing machine learning based on the derivative parameters output by the derivative parameter preprocessor.

In yet another aspect, various aspects of the present invention are directed to providing a brake control system using the metamodel for friction coefficient prediction generated by the above system, the brake control system including the metamodel for friction coefficient prediction, and a brake controller configured to determine brake torque based on a friction coefficient output by the metamodel for friction coefficient prediction and to apply the brake torque to a brake system.

Other aspects and exemplary embodiments of the invention are discussed infra.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
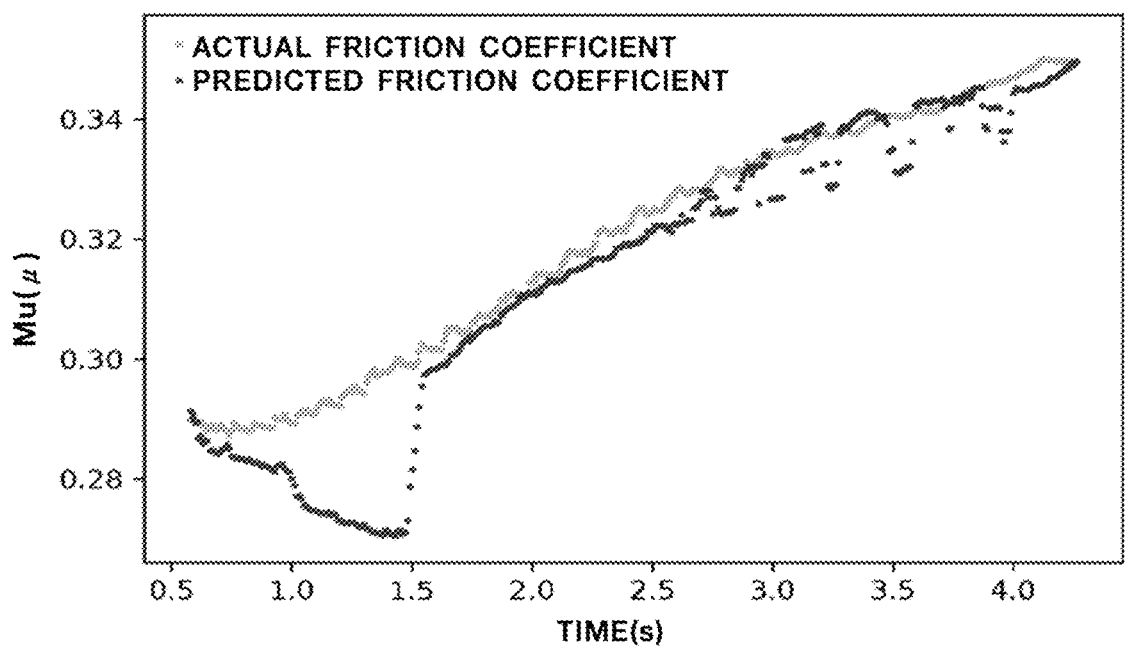
FIG. 1, FIG. 2, FIG. 3, FIG. 4, FIG. 5 and FIG. 6 are graphs representing inaccuracy of a predicted friction coefficient output by a conventional metamodel for friction coefficient prediction.
Figure 2:
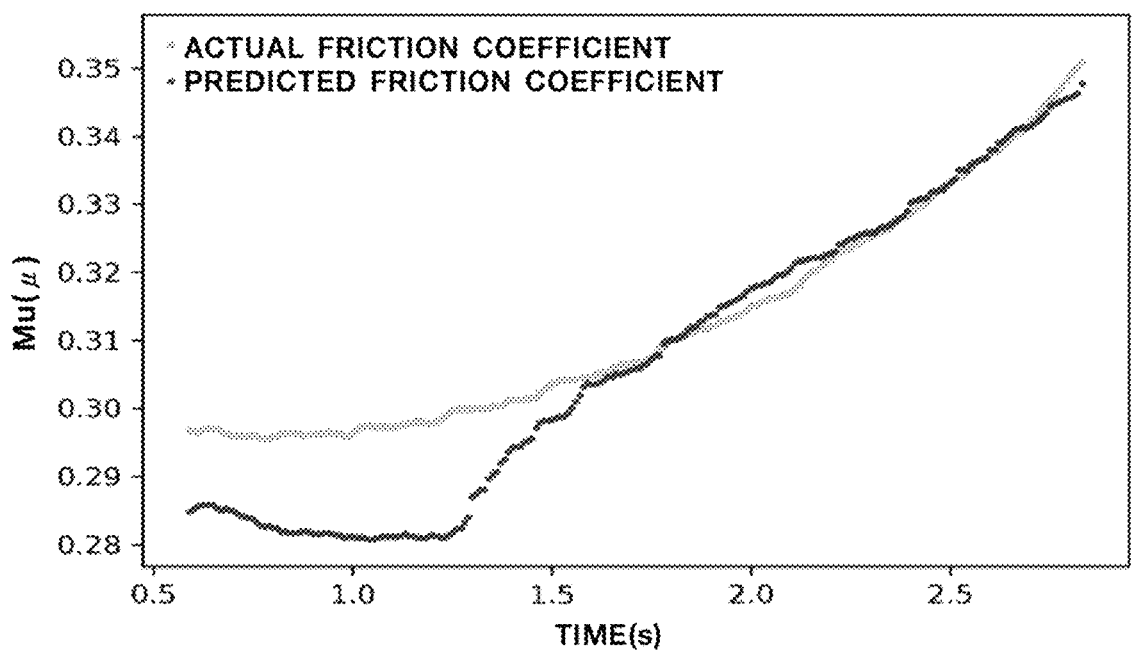
Figure 3:
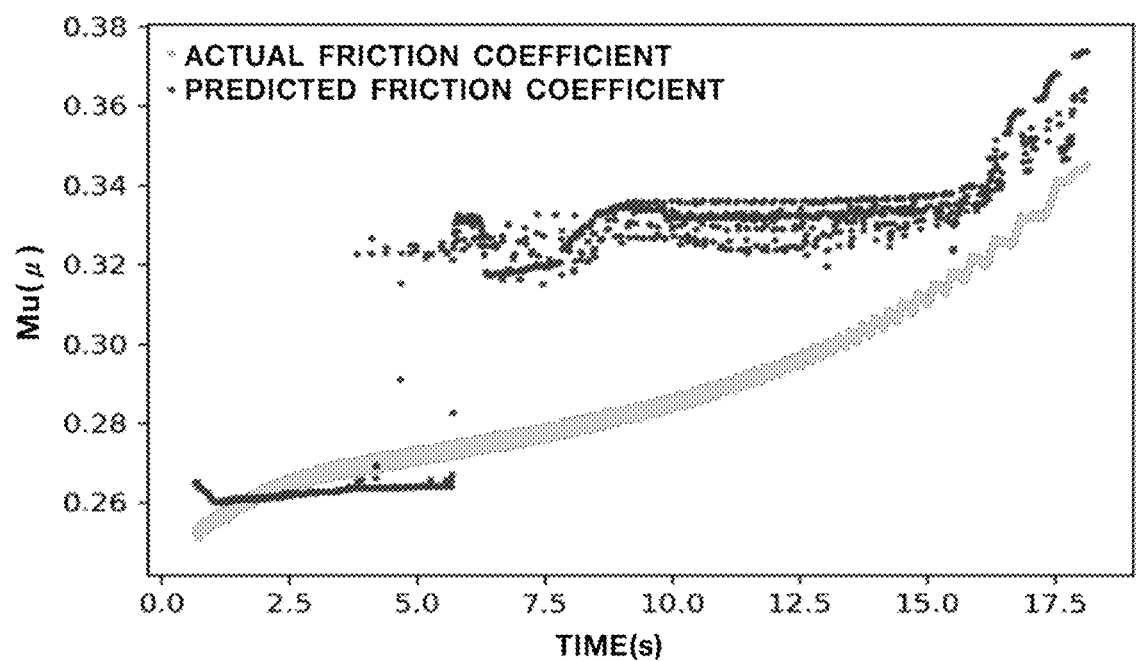
Figure 4:
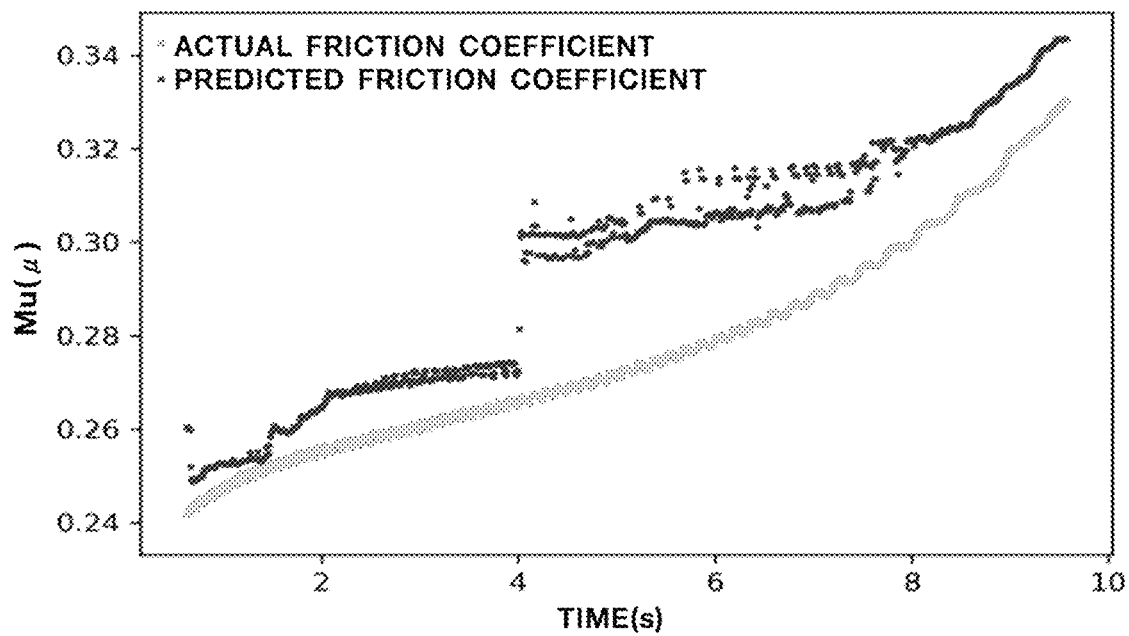
Figure 5:
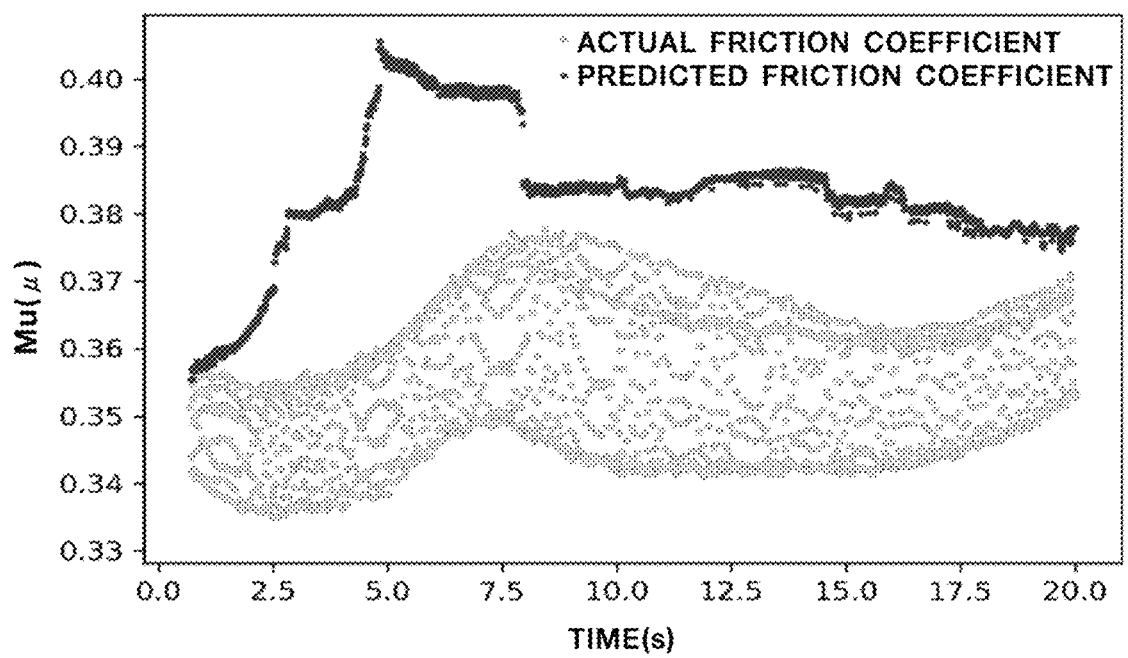
Figure 6:
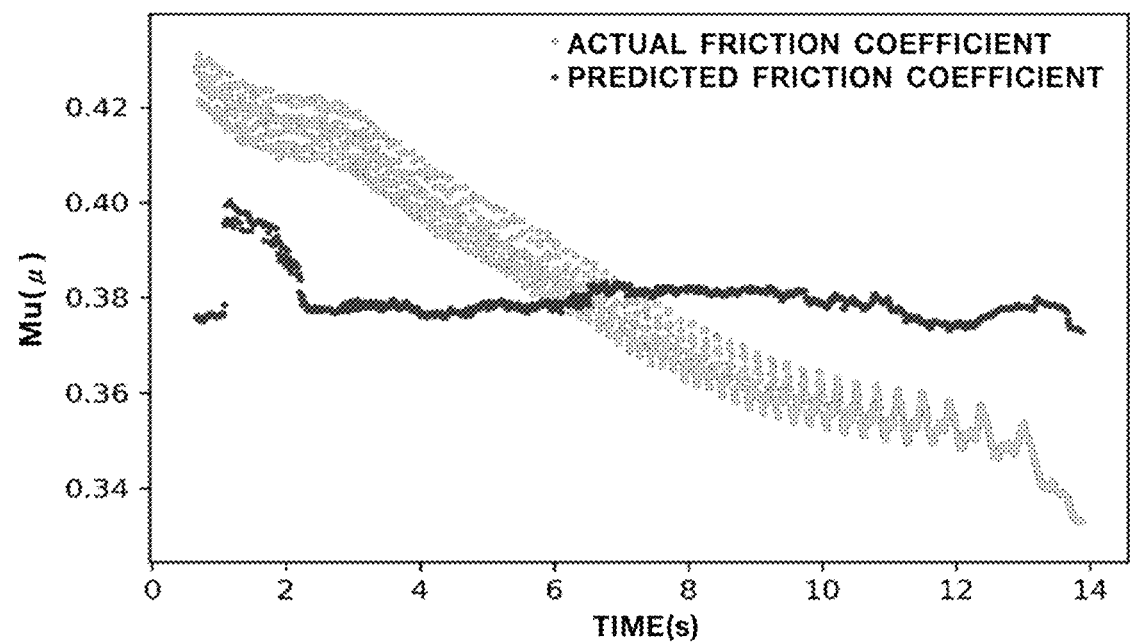

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will now be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the other hand, the present invention is directed to cover not only the exemplary embodiments of the present invention, but also various alternatives, modifications, equivalents and other embodiments, which may be included within the spirit and scope of the present invention as defined by the appended claims.

Figure 7:
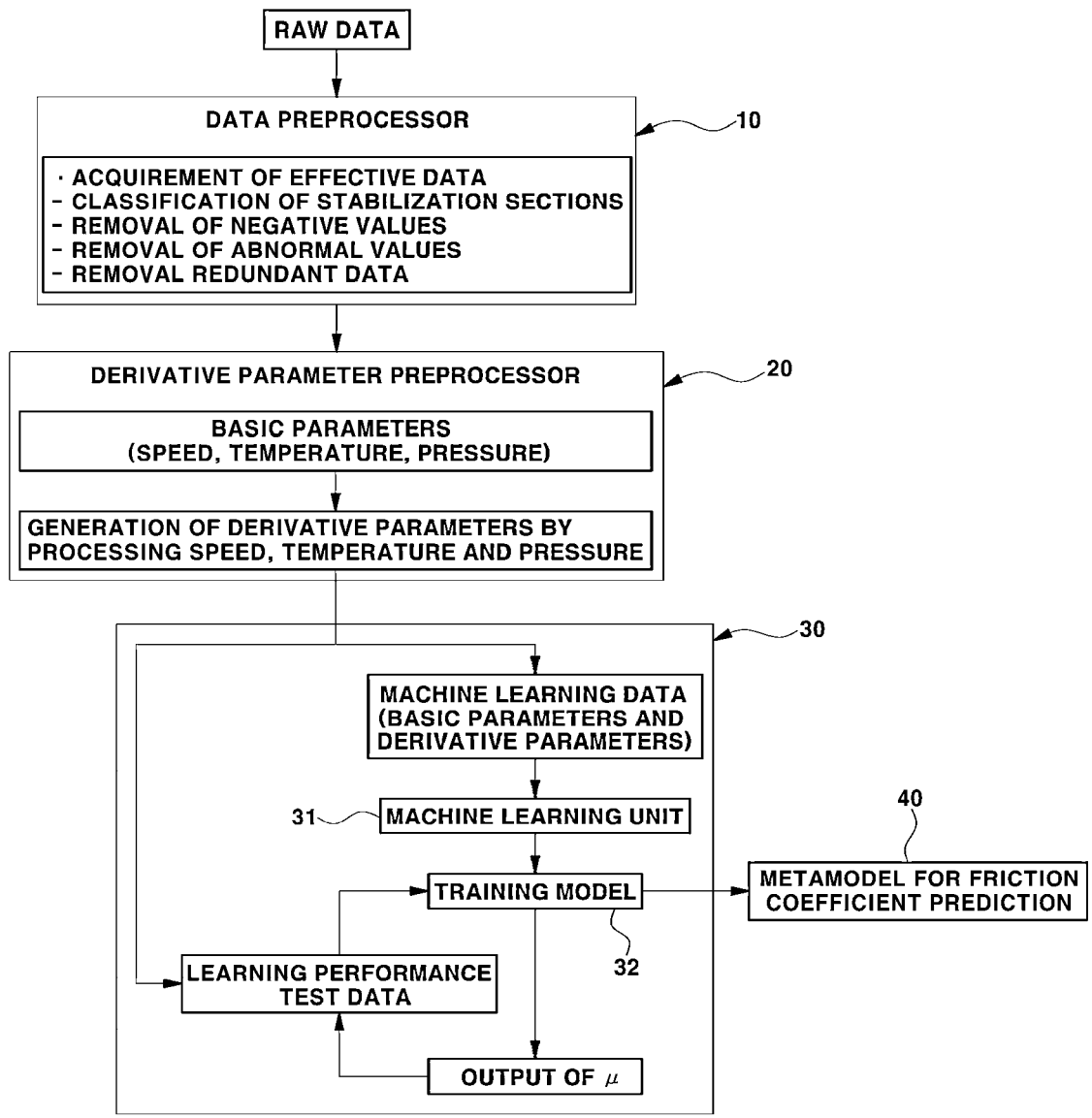
FIG. 7 is a block diagram illustrating a system for upgrading a metamodel for friction coefficient prediction of a brake pad according to various exemplary embodiments of the present invention.

FIG. 7 is a block diagram illustrating a system for upgrading a metamodel for friction coefficient prediction of a brake pad according to various exemplary embodiments of the present invention.

As shown in FIG. 7, a system for upgrading a metamodel 40 for friction coefficient prediction of a brake pad according to various exemplary embodiments of the present invention includes a data preprocessor 10 configured to preprocess raw data, such as a friction coefficient, and the rotation speed, temperature and pressure of a brake disc relating to the friction coefficient, to validate the raw data, a derivative parameter preprocessor 20 configured to generate derivative parameters from basic parameters, i.e., the rotation speed, temperature and pressure of the brake disc, output by the data preprocessor 10 using principal factor analysis, and a machine learning processor 30 configured to generate the metamodel 40 for friction coefficient prediction by performing machine learning based on the derivative parameters output by the derivative parameter preprocessor 20.

Considering that the behavior of the friction coefficient varies depending on the use history of friction elements, such as the brake disc, the raw data is data acquired through evaluation of the behavior of a new friction element before burnishing, evaluation of the behavior of the friction element after burnishing, evaluation of the behavior of the friction element during occurrence of fade, evaluation of the behavior of the friction element after occurrence of the fade, etc., and the raw data includes input data (the rotation speed, temperature and pressure of the brake disc) and output data (the friction coefficient) which are necessary for performing machine learning.

The data preprocessor 10 is configured to acquire valid data from the raw data by performing preprocessing of the raw data, such as classification of data stabilization sections for reliability of the raw data, removal of negative values and abnormal values deviating from a reference range, and removal of redundant data.

Considering that there are no linear relations between the basic parameters, such as the rotation speed, temperature and pressure of the brake disc, preprocessed by the data preprocessor 10 and the friction coefficient and a friction coefficient difference occurs under the same condition of each of the respective basic parameters, the derivative parameter preprocessor 20 is configured to define the derivative parameters as principal factors influencing a change in the friction coefficient by analyzing the relations between the basic parameters and the friction coefficient at a point in time when the friction coefficient difference occurs.

For example, the derivative parameter preprocessor 20 generates derivative parameters which are defined through smoothing and lag processing in time series analysis of each of the parameters, among data analysis methods.

The derivative parameters defined and generated by the derivative parameter preprocessor 20 may include a moving average of pressure (press_w), a moving average of the rotation speed of the brake disc (speed_w), a moving average of the temperature of the brake disc (disc_1c_w), the square of the moving average of the temperature of the brake disc (disc_1c_w_2d), a deceleration of the brake disc, a change in the temperature of the brake disc (temp_rate), a change in the temperature change of the brake disc (temp_jerk), a change in pressure (press_rate), an estimated torque value using the deceleration (torque_est), a correlation value between the estimated torque value and the temperature (torque_est_temp), kinetic energy of the brake disc (ke), cumulative kinetic energy of the brake disc (ke_cumsum), etc.

The moving average of pressure (press_w) is, considering that various physical phenomena are conducted within a short time period because of characteristics of evaluation of the friction coefficient of the brake disc and there are many unexpected interactions between parameters due to a large amount of noise during a measurement process using a sensor of measurement equipment, a derivative parameter defined as the moving average of pressure (hydraulic brake pressure) data among the basic parameters to improve performance of a friction coefficient training model 32 among elements included in the machine preprocessor 30.

The moving average of the rotation speed of the brake disc (speed_w) is, considering that various physical phenomena are conducted within a short time period because of characteristics of evaluation of the friction coefficient of the brake disc and there are many unexpected interactions between parameters due to a large amount of noise during a measurement process using a sensor of measurement equipment, a derivative parameter defined as the moving average of the rotation speed (rad/s) data of the brake disc among the basic parameters to improve performance of the friction coefficient training model 32 among the elements included in the machine preprocessor 30.

The moving average of the temperature of the brake disc (disc_1c_w) is, considering that various physical phenomena are conducted within a short time period because of characteristics of evaluation of the friction coefficient of the brake disc and there are many unexpected interactions between parameters due to a large amount of noise during a measurement process using a sensor of measurement equipment, a derivative parameter defined as the moving average of the temperature data of the brake disc among the basic parameters to improve performance of the friction coefficient training model 32 among the elements included in the machine preprocessor 30.

The square of the moving average of the temperature of the brake disc (disc_1c_w_2d) is a derivative parameter defined as the square of the moving average of the temperature of the brake disc to improve performance of the friction coefficient training model 32 through reflection of a feature, in which, as the range of the change in the temperature of the brake disc increases, the range of the fluctuation of the friction coefficient increases.

Considering that brake torque is defined from a relational expression with the friction coefficient and thus has a correlation with the friction coefficient, but the brake torque is a parameter defined using the relational expression with the friction coefficient, which is an output parameter in machine learning, and is thus not configured for being used as input data for machine learning, the deceleration of the brake disc has a linear relation with the brake torque, is not directly involved with the friction coefficient through a relational expression with the friction coefficient, and has a linear relation with the friction coefficient, thus being configured for being used as a derivative parameter instead of the brake torque.

Preferably, to improve performance of the friction coefficient training model 32 in consideration of the previous state of the brake disc and the current state of the brake disc, a change in the deceleration which is a difference (speed$_t$-speed$_{t-n}$) between a current deceleration value of the brake disc at the present point in time and a deceleration value of the brake disc at a previous point in time may be used as a derivative parameter instead of the deceleration of the brake disc.

The change in the temperature of the brake disc (temp_rate) is a difference (temp$_t$-temp$_{t-n}$) between a current temperature value of the brake disc at the present point in time and a temperature value of the brake disc at a previous point in time, and is selected as one of the derivative parameters to improve performance of the friction coefficient training model 32 through reflection of the feature, in which, as the range of the change in the temperature of the brake disc increases, the range of the fluctuation of the friction coefficient increases, and in consideration of the previous state of the brake disc and the current state of the brake disc.

The change in the temperature change of the brake disc (temp_jerk) is a difference (temp_rate$_t$-temp_rate$_{t-n}$) between a current temperature change at the present point in time and a temperature change of the brake disc at a previous point in time, and is selected as one of the derivative parameters to improve performance of the friction coefficient training model 32 through reflection of the feature, in which, as the range of the change in the temperature of the brake disc increases, the range of the fluctuation of the friction coefficient increases, and in consideration of the previous state of the brake disc and the current state of the brake disc.

The change in pressure (press_rate) is a difference (press$_t$-press$_{t-n}$) between current pressure at the present point in time and pressure at a previous point in time, and is selected as one of the derivative parameters to improve performance of the friction coefficient training model 32, considering a physical phenomenon in which the friction coefficient is influenced by pressure (hydraulic pressure), and influence of the previous pressure on the current pressure.

The estimated torque value using the deceleration (torque_est) is a value acquired by dividing the deceleration by pressure (deceleration/pressure), and is selected as one of the derivative parameters to improve performance of the friction coefficient training model 32, considering that the deceleration of the brake disc has a linear relation with the brake torque and simultaneously has a linear relation with the friction coefficient.

The correlation value between the estimated torque value and the temperature (torque_est_temp) is a value acquired by multiplying the estimated torque value using the deceleration by the temperature of the brake disc ((deceleration/pressure)×temperature), and is selected as one of the derivative parameters to improve performance of the friction coefficient training model 32, considering that the deceleration of the brake disc has a linear relation with the brake torque and simultaneously has a linear relation with the friction coefficient, and considering interaction between the estimated torque value using the deceleration (deceleration/pressure) and the temperature of the brake disc.

The kinetic energy of the brake disc (ke) is a derivative parameter defined as a speed polynomial, i.e., $V^2$, acquired by removing a polynomial 0.5×m (m being weight) from a kinetic energy equation [$E=0.5\times mV^2$] by normalizing the polynomial 0.5×m, to improve performance of the friction coefficient training model 32, considering a physical phenomenon in which, as kinetic energy is converted into thermal energy during braking, the temperature of the brake disc is raised.

The cumulative kinetic energy of the brake disc (ke_cumsum) is a derivative parameter defined as a cumulative value of the speed polynomial, i.e., $V^2$, acquired by removing the polynomial 0.5×m (m being weight) from the kinetic energy equation [$E=0.5\times mV^2$] by normalizing the polynomial 0.5×m, to improve performance of the friction coefficient training model 32, considering a physical phenomenon in which, as cumulative kinetic energy increases, force for braking increases.

The machine preprocessor 30 includes a machine learning unit 31 configured to perform machine learning based on the derivative parameters generated by the derivative parameter preprocessor 20 in addition to the basic parameters, and the friction coefficient training model 32 constructed through the machine learning performed by the machine learning unit 31, and when the machine learning based on the basic parameters and the derivative parameters is completed, the friction coefficient training model 32 is generated as the metamodel 40 for friction coefficient prediction.

Accordingly, the metamodel 40 for friction coefficient prediction may be constructed using a machine learning algorithm, and may be constructed using a machine learning algorithm in which basic parameters and derivative parameters suitable for the characteristics of the friction coefficient may be selected, among various machine leaning algorithms.

As various exemplary embodiments of the present invention, the metamodel 40 for friction coefficient prediction may be constructed using a usual decision tree algorithm in which, when the above-described derivative parameters in addition to the basic parameters, such as the rotation speed, temperature and pressure of the brake disc, are set to input data and one parameter, i.e., the friction coefficient, is set to output data, a question about one output value for each input value is asked so that the answer to the question is "yes" or "no", the question is repeated until a value R determining the answer of "yes", is output, and the value R is defined as the output value, among various machine learning algorithms.

As various exemplary embodiments of the present invention, the metamodel 40 for friction coefficient prediction may be constructed using a usual random forest algorithm in which, when the above-described derivative parameters in addition to the basic parameters, such as the rotation speed, temperature and pressure of the brake disc, are set to input data and one parameter, i.e., the friction coefficient, is set to output data, one output value for each input value is sampled with replacement several times, a question about the output value is asked so that the answer to the question is "yes" or "no", the question is repeated until a value R determining the answer of "yes", is output, and the average value of the values R determined through the sampling with replacement several times is defined as the output value, among various machine learning algorithms.

Figure 8:
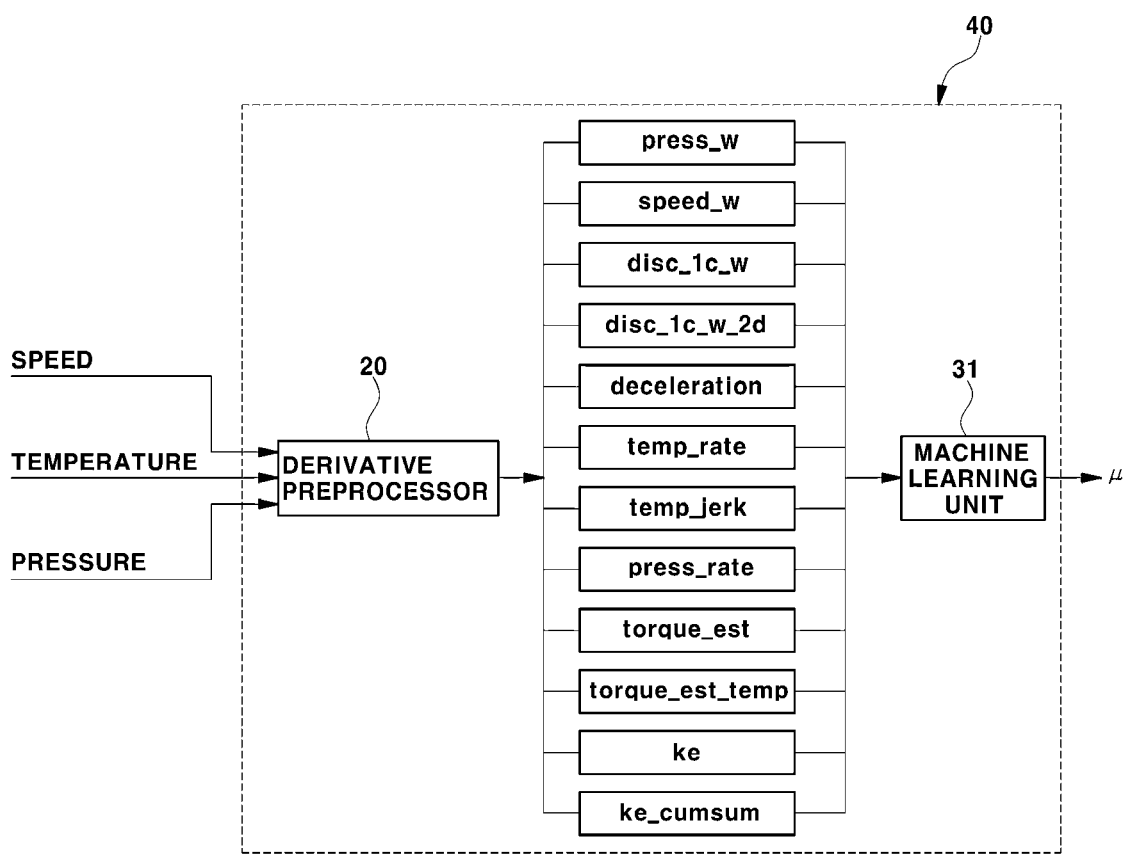
FIG. 8 is a block diagram illustrating one example of driving of the metamodel for friction coefficient prediction generated through the system for upgrading the metamodel for friction coefficient prediction according to various exemplary embodiments of the present invention.

FIG. 8 is a block diagram illustrating one example of driving of the metamodel for friction coefficient prediction generated through the system for upgrading the metamodel for friction coefficient prediction according to various exemplary embodiments of the present invention.

As shown in FIG. 8, the metamodel 40 for friction coefficient prediction may include the derivative parameter preprocessor 20 configured to generate the derivative parameters from the basic parameters, such as the rotation speed, temperature and pressure of the brake disc, using principal factor analysis, and the machine learning unit 31 configured to perform machine learning based on the derivative parameters in addition to the basic parameters.

Therefore, when the basic parameters, such as the rotation speed, temperature and pressure of the brake disc, are input to the metamodel 40, the derivative parameter preprocessor 20 may generate the derivative parameters, and the machine learning processor 30 may output the friction coefficient predicted by performing machine learning based on the derivative parameters in addition to the basic parameters.

As a test example, the friction coefficient output by the metamodel 40 for friction coefficient prediction according to various exemplary embodiments of the present invention was compared with the fiction coefficient output by the conventional metamodel for friction coefficient prediction, and results of comparison are shown in FIG. 10, FIG. 11, FIG. 12, FIG. 13, FIG. 14 and FIG. 15.

Figure 10:
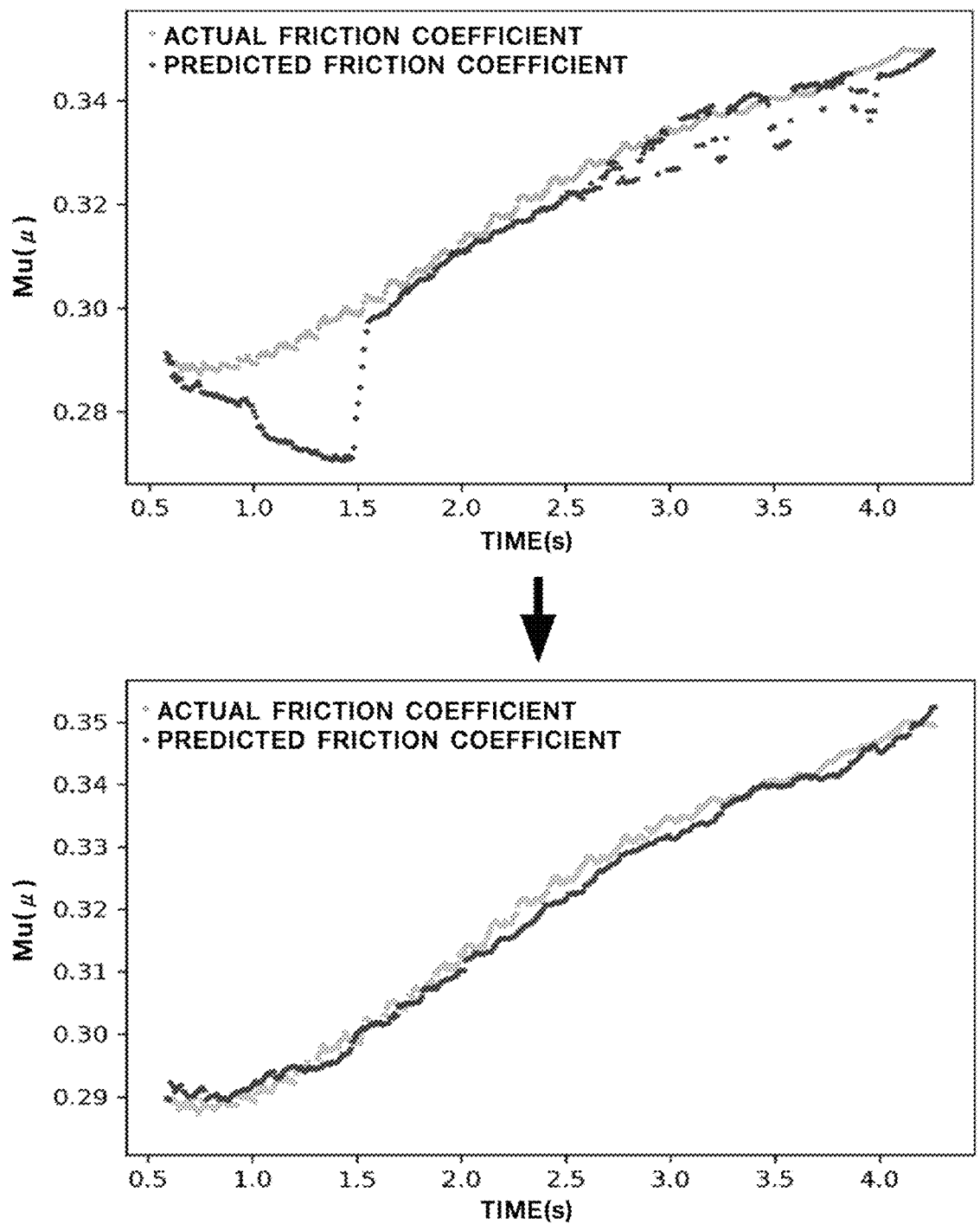
FIG. 10, FIG. 11, FIG. 12, FIG. 13, FIG. 14 and FIG. 15 are graphs representing accuracy of a predicted friction coefficient output by the metamodel for friction coefficient prediction according to various exemplary embodiments of the present invention compared to the predicted friction coefficient output by the conventional metamodel.
Figure 11:
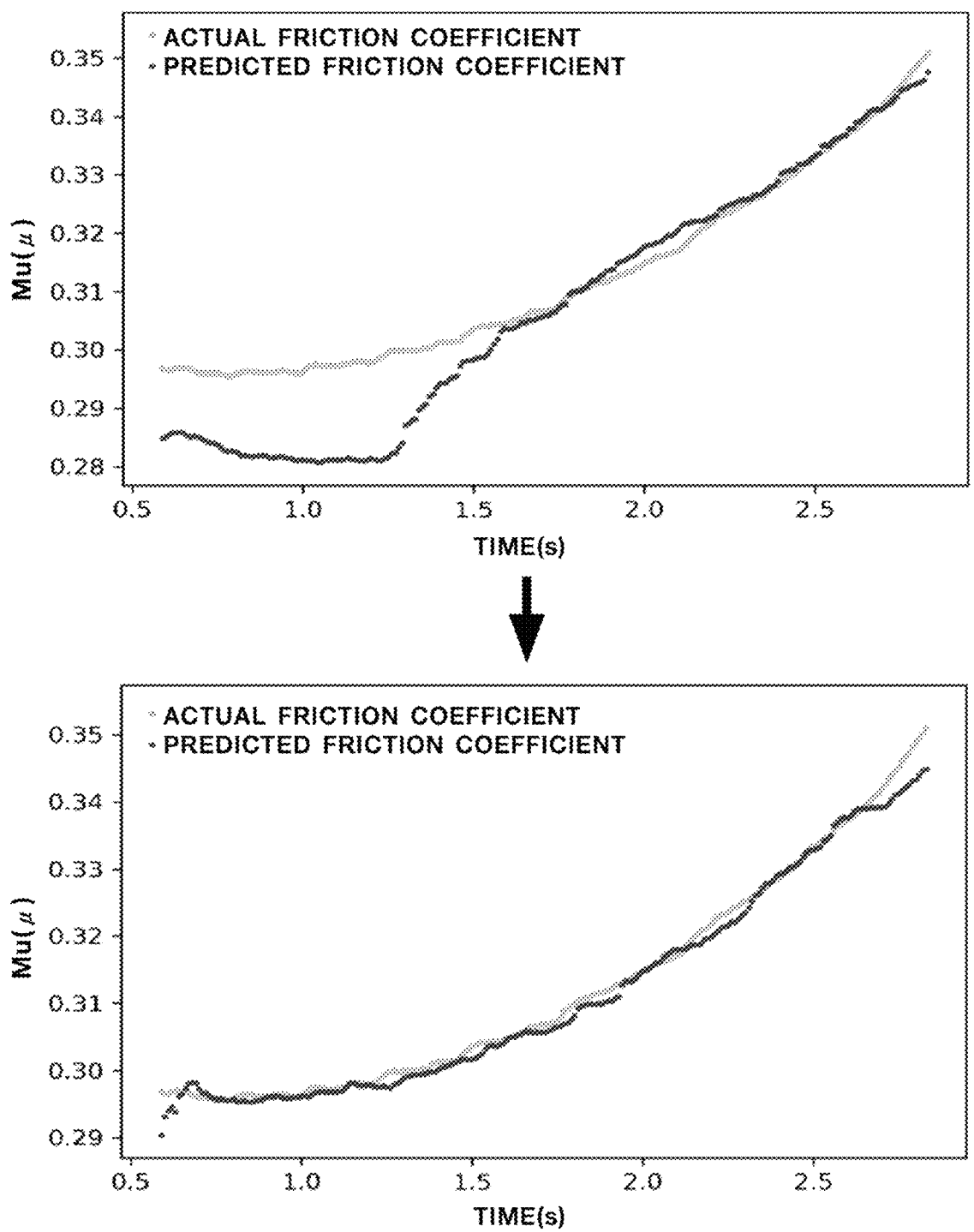

Referring to FIG. 10, and FIG. 11, the curve of the predicted friction coefficient output by the metamodel 40 for friction coefficient prediction according to various exemplary embodiments of the present invention is not cut at a specific time point and does not suddenly drop, or does not deviate downwards from an actual friction coefficient curve in a specific time section, and follows the actual friction coefficient curve, and thus, it may be confirmed that accuracy in friction coefficient prediction is improved.

Figure 12:
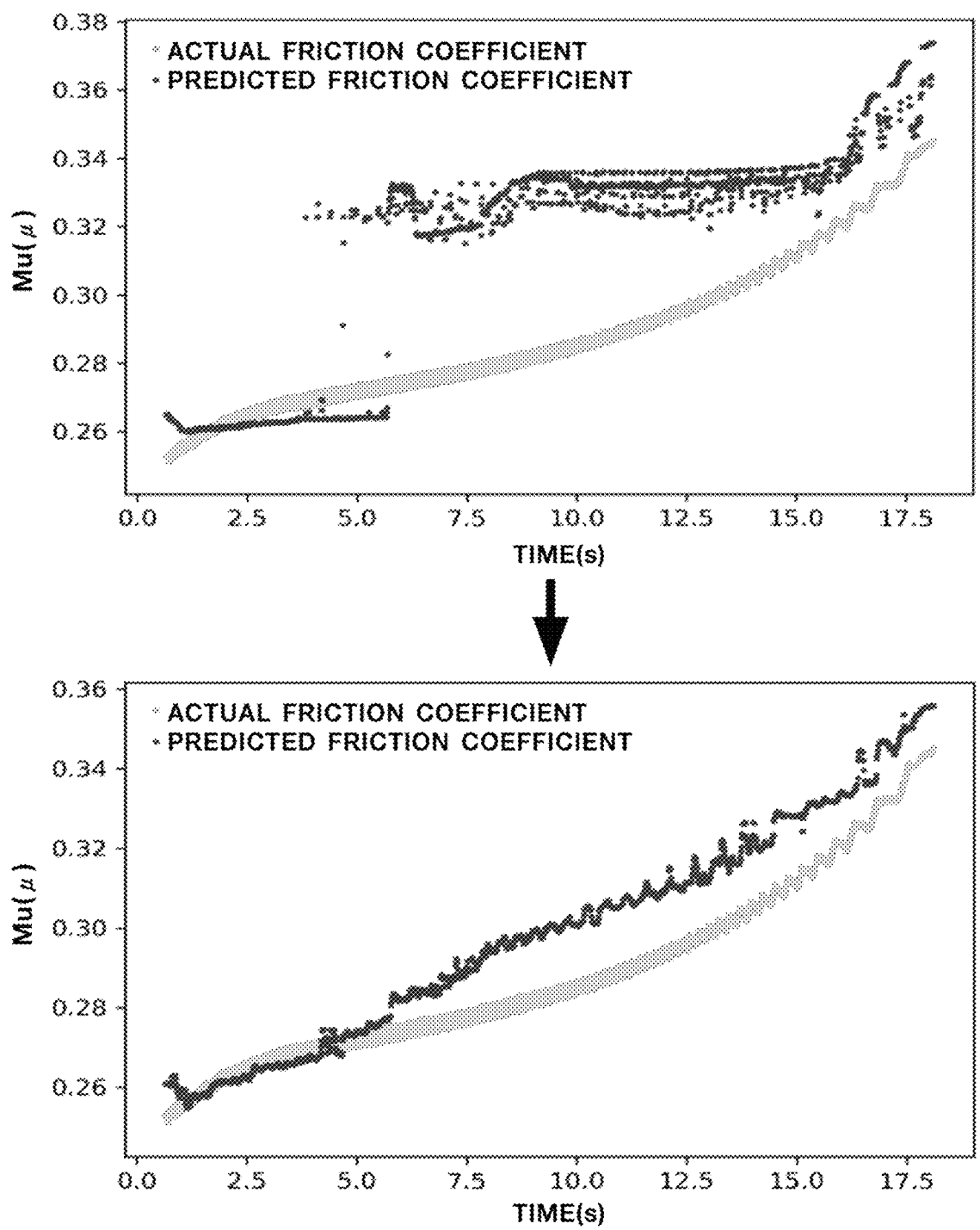
Figure 13:
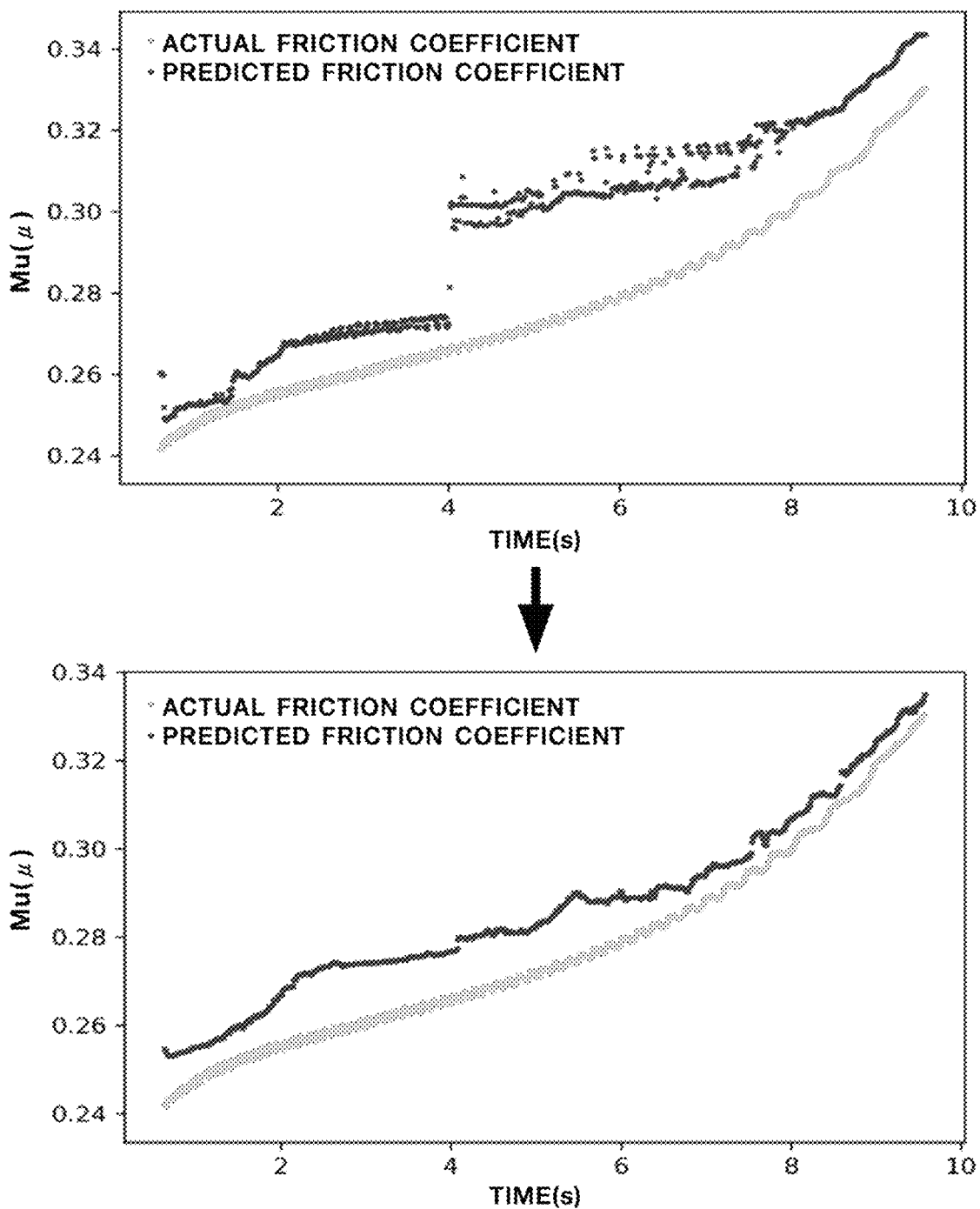

Referring to FIG. 12, and FIG. 13, the curve of the predicted friction coefficient output by the metamodel 40 for friction coefficient prediction according to various exemplary embodiments of the present invention is continuous, is not cut in a specific section and follows the actual friction coefficient curve, and thus, it may be confirmed that accuracy in friction coefficient prediction is improved.

Figure 14:
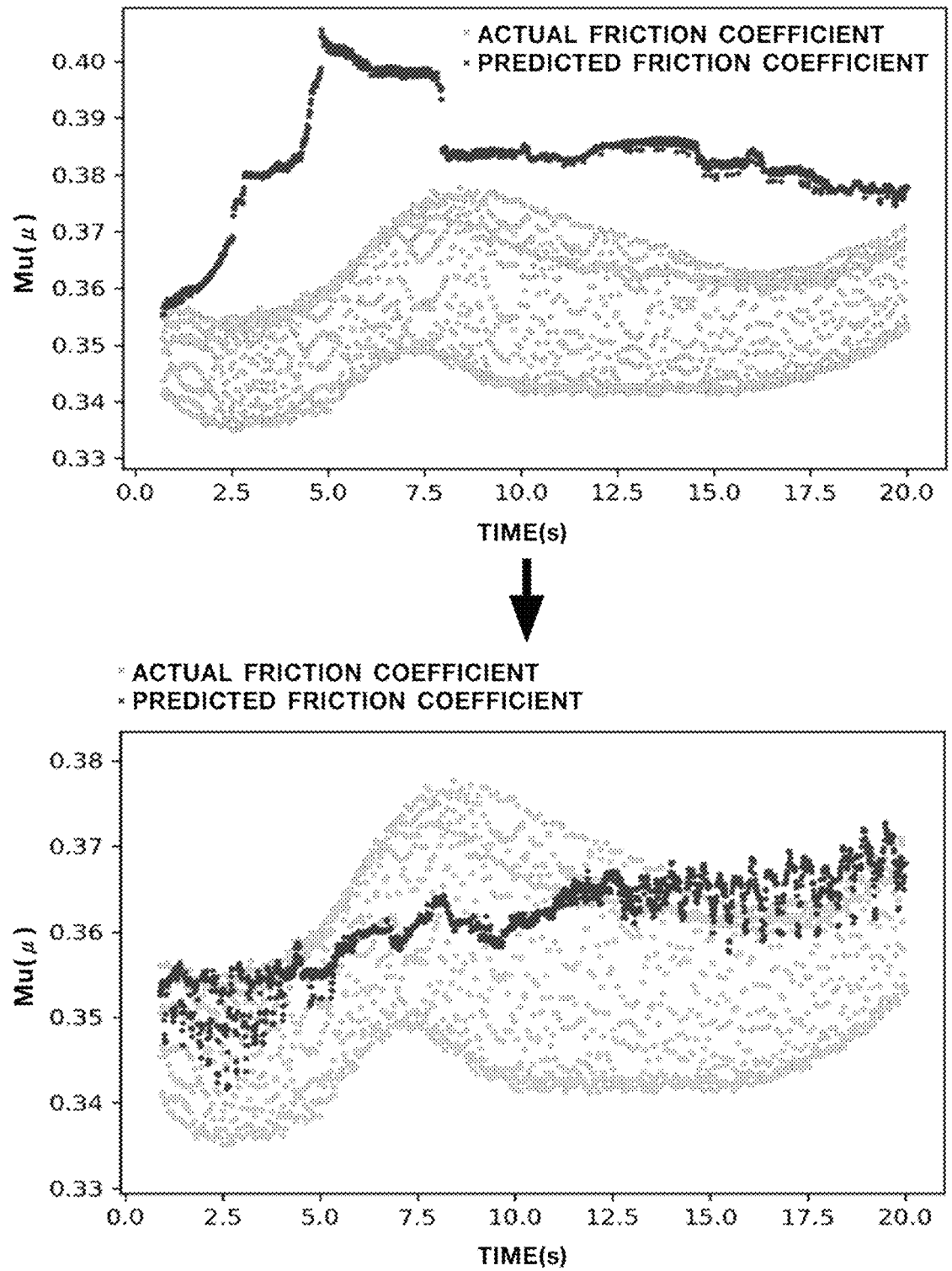
Figure 15:
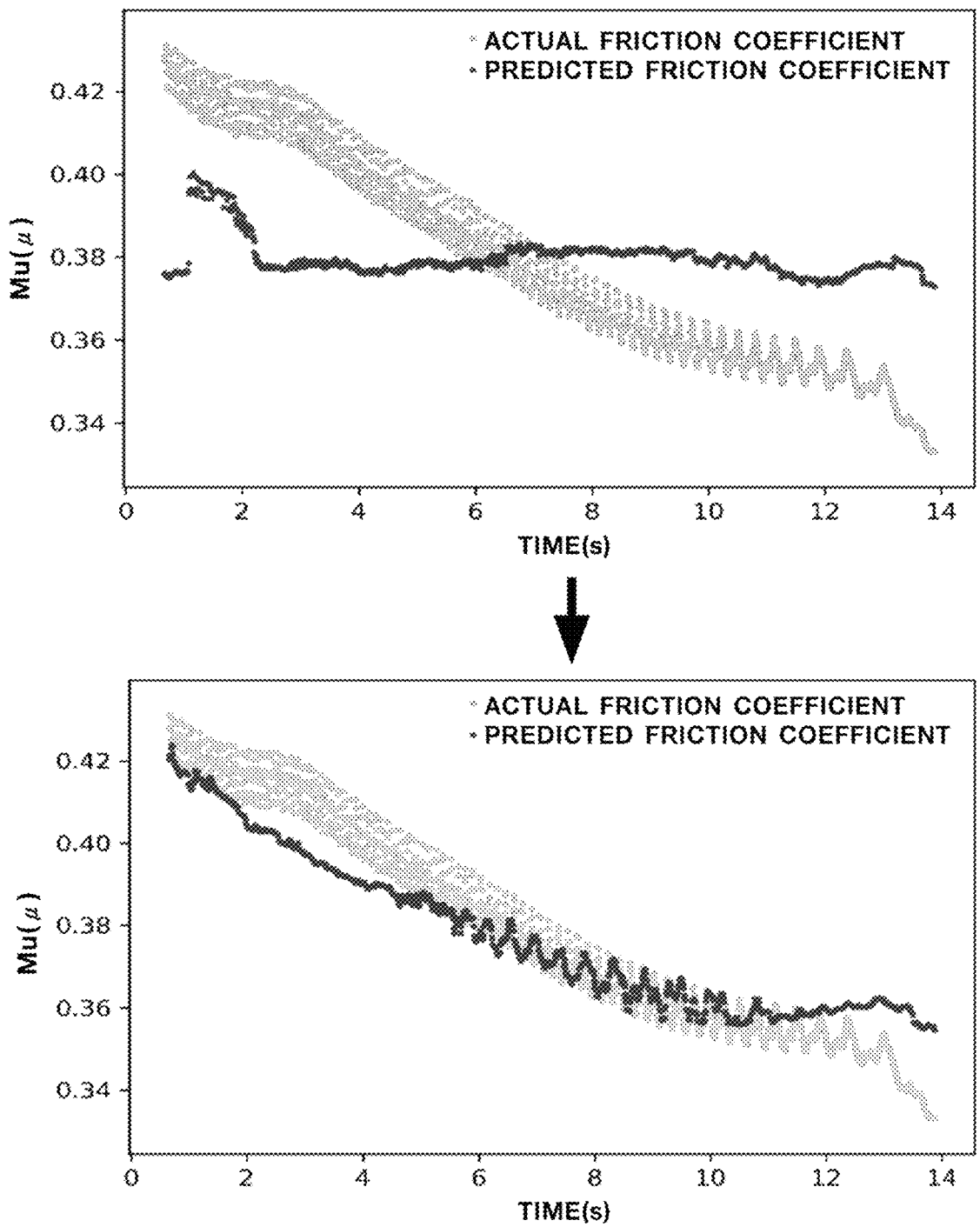

Referring to FIG. 14, and FIG. 15, the predicted friction coefficient output by the metamodel 40 for friction coefficient prediction according to various exemplary embodiments of the present invention is within an actual friction coefficient distribution, and thus, it may be confirmed that accuracy in friction coefficient prediction is improved.

Figure 9A:
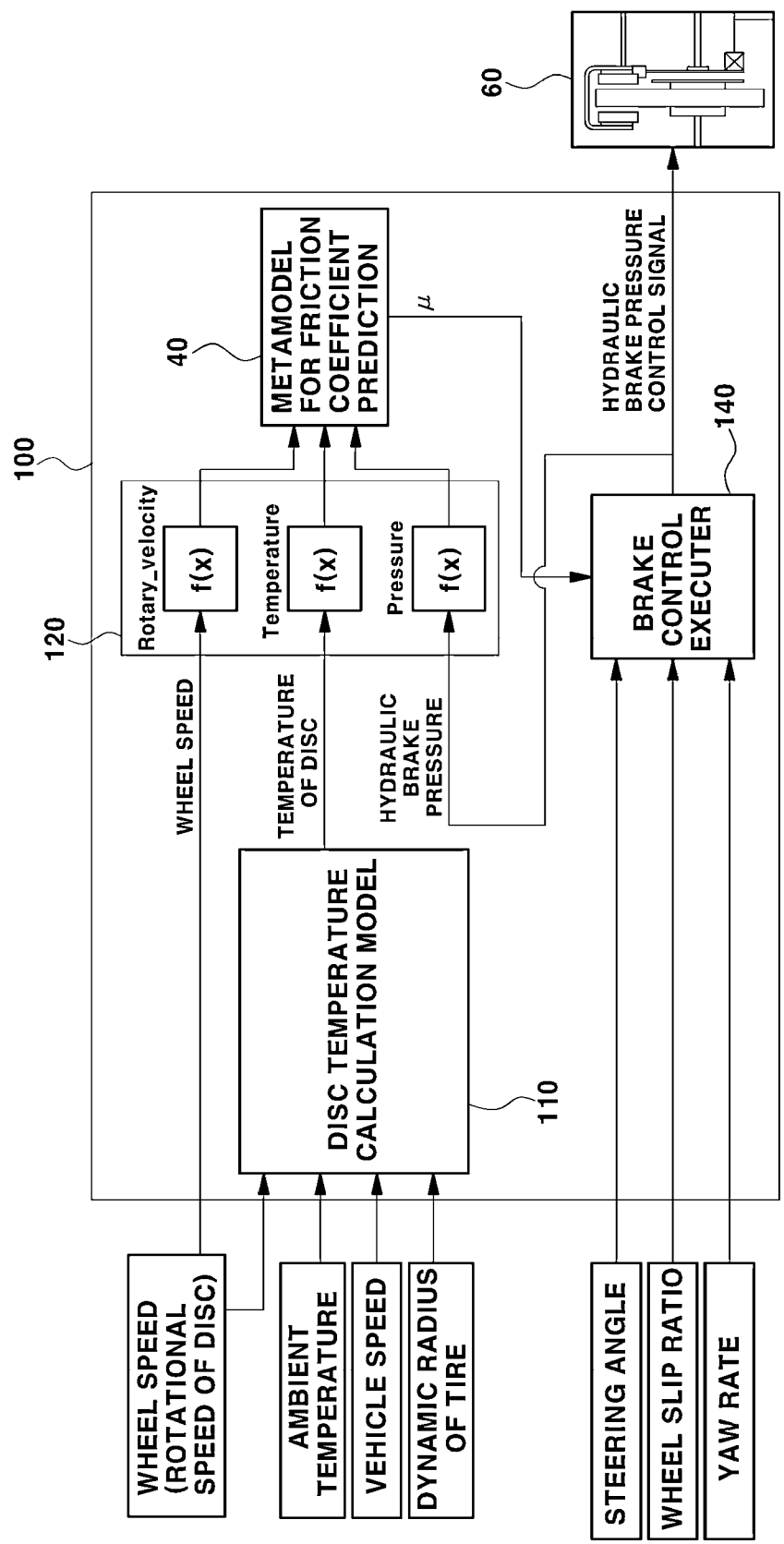
FIG. 9A is a control block diagram illustrating one example of a brake control system to which the metamodel for friction coefficient prediction generated through the system for upgrading the metamodel for friction coefficient prediction according to various exemplary embodiments of the present invention is applied.
Figure 9B:
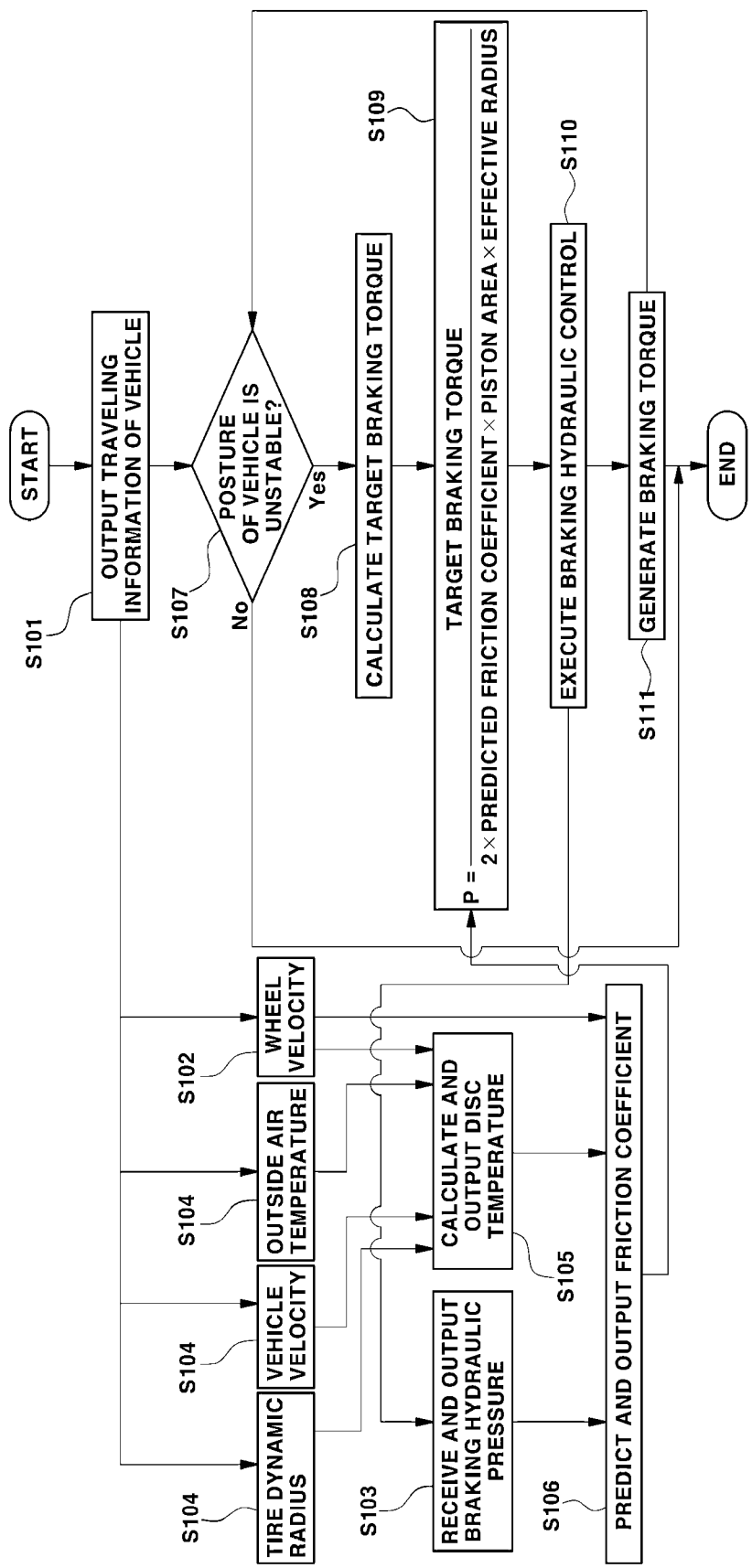
FIG. 9B is a flowchart illustrating one example of a brake control method to which the metamodel for friction coefficient prediction generated through the system for upgrading the metamodel for friction coefficient prediction according to various exemplary embodiments of the present invention is applied.

FIG. 9A is a control block diagram illustrating one example of a brake control system in which the metamodel for friction coefficient prediction generated through the system for upgrading the metamodel for friction coefficient prediction according to various exemplary embodiments of the present invention is applied, and FIG. 9B is a flowchart illustrating one example of a brake control method to which the metamodel for friction coefficient prediction generated through the system for upgrading the metamodel for friction coefficient prediction according to various exemplary embodiments of the present invention is applied.

As shown in FIG. 9A, the brake control system may include the metamodel 40 for friction coefficient prediction generated through various machine learning algorithms based on the derivative parameters in addition to the basic parameters, and a brake controller 100 configured to determine brake torque based on a friction coefficient output by the metamodel 40 for friction coefficient prediction and to apply the brake torque to a brake system 60.

Of course, the metamodel 40 for friction coefficient prediction may include, as described above, the derivative parameter preprocessor 20 configured to generate the derivative parameters from the basic parameters, such as the rotation speed, temperature and pressure of the brake disc, using principal factor analysis, and the machine learning processor 30 configured to perform machine learning based on the derivative parameters in addition to the basic parameters.

Therefore, when the basic parameters, such as the rotation speed, temperature and pressure of the brake disc, are input to the metamodel 40 for friction coefficient prediction, the derivative parameter preprocessor 20 may generate the derivative parameters, and the machine learning unit 31 may output the friction coefficient predicted by performing machine learning based on the derivative parameters in addition to the basic parameters.

Therefore, the brake controller 100 determines brake torque TorqueBrake using a general determination equation, i.e., Equation 1 below, in which the friction coefficient output by the metamodel 40 for friction coefficient prediction is reflected.

$$Torque_{Brake} = 2 \times \mu \times p \times A_{piston} \times R_{effective} \qquad [\text{Equation 1}]$$

In the above Equation 1, µ indicates the friction coefficient, p indicates hydraulic pressure, $A_{piston}$ indicates the cross-sectional area of the piston of a wheel cylinder, and $R_{effective}$ indicates the effective radius of the brake disc.

For reference, the effective radius of the brake disc is a length from the rotation center of the brake disc to a point of action of the brake disc to which brake force is applied by the piston of a brake caliper.

Here, because the friction coefficient used in determination of the brake torque by the brake controller 100 is an accurately predicted friction coefficient in which the derivative parameters in addition to the basic parameters are reflected, the brake torque may be more accurately determined.

Accordingly, when the brake torque determined by the brake controller 100 is applied to the brake system 60 of the vehicle, the brake system 60 of the vehicle may be operated with the brake torque determined by the brake controller 100, and accordingly, performance of the brake system 60 of the vehicle may be accurately evaluated and reliability of the brake system 60 of the vehicle may be improved.

The brake controller 100 may include, as shown in FIG. 9A, a disc temperature calculation model 110, the metamodel 40 for friction coefficient prediction configured to predict and output a friction coefficient based on three or more input values, such as the rotation speed of the brake disc, the temperature of the brake disc, and hydraulic brake pressure, input through a friction coefficient model input unit 120, and a brake control executer 140 configured to determine target brake torque based on the friction coefficient output by the metamodel 40 for friction coefficient prediction and to apply a hydraulic brake pressure control signal corresponding to the determined target brake torque to the brake system 60.

Hereinafter, one example of the brake control method to which the metamodel 40 for friction coefficient prediction generated through the system for upgrading the metamodel 40 for friction coefficient prediction according to various exemplary embodiments of the present invention is applied will be described with reference to FIG. 9B.

First, driving information of the vehicle is output to the brake controller 100 while driving (S101).

Therefore, as the driving information of the vehicle, a wheel speed (i.e., the rotation speed of the brake disc) detected by a wheel speed sensor, an ambient temperature, a vehicle speed, a dynamic radius of tires, a steering angle, a wheel slip ratio, a yaw rate, etc., are input to the brake controller 100.

One of control factors for friction coefficient prediction, the wheel speed is input to the metamodel 40 for friction coefficient prediction through the friction coefficient model input unit 120 of the brake controller 100 (S102).

As another of the control factors for friction coefficient prediction, hydraulic brake pressure at the time of previous braking is input to the metamodel 40 for friction coefficient prediction from the brake control executer 140 of the brake controller 100 through the friction coefficient model input unit 120 of the brake controller 100 (S103).

As yet another of the control factors for friction coefficient prediction, the temperature of the brake disc is input to the metamodel 40 for friction coefficient prediction through the friction coefficient model input unit 120.

For the present purpose, when the wheel speed, the ambient temperature, the vehicle speed, and the dynamic radius of the tires are input to the brake disc temperature calculation model 110 (S104), the brake disc temperature calculation model 110 determines the temperature of the brake disc based on the wheel speed, the ambient temperature, the vehicle speed, and the dynamic radius of the tires, and outputs the determined temperature of the brake disc to the metamodel 40 for friction coefficient prediction through the friction coefficient model input unit 120 (S105).

Thereafter, when the basic parameters, such as the rotation speed of the brake disc, the temperature of the brake disc and the hydraulic brake pressure, are input to the metamodel 40 for friction coefficient prediction, the derivative parameter preprocessor 20 generates derivative parameters, and the machine learning unit 30 outputs a friction coefficient predicted by performing machine learning based on the derivative parameters in addition to the basic parameters (S106).

Subsequently, the brake control executer 140 determines target brake torque (S108), and determines hydraulic brake pressure facilitating generation of the determined target brake torque (S109).

Here, the hydraulic brake pressure facilitating generation of the target brake torque is determined by Equation 2 below in which the friction coefficient output by the metamodel 40 for friction coefficient prediction is reflected.

$$P = \frac{\text{Target Brake Torque}}{2 \times \text{Piston Area} \times \text{Friction} \times \text{Effective Radius} \times \text{Number of Pad} \times \text{Number of Piston}} \quad \text{[Equation 2]}$$

In the above Equation 2, P indicates the hydraulic brake pressure, Piston Area indicates the area of a piston of a wheel cylinder included a brake caliper configured to pressurize the brake pads, and Effective Radius indicates a length from the rotation center of the brake disc to a point of action of the brake disc to which brake force is applied by the piston of the brake caliper.

Thereafter, the brake control executer 140 executes hydraulic brake pressure control in which the hydraulic brake pressure determined by the above Equation 2 is applied to the brake system 60 (S110).

When the hydraulic brake pressure determined by the above Equation 2 is applied to the brake system 60, brake torque due to friction contact between the brake pads and the brake disc is generated to substantially execute braking (S111).

Intervention into brake control, such as the determination of the target brake torque by the brake control executer 140 (S108), the determination of the hydraulic brake pressure facilitating generation of the determined target brake torque (S109) and the execution of the hydraulic brake pressure control (S110), may be performed to secure vehicle stability when the posture of the vehicle is determined as being in an unstable state.

Therefore, whether or not the posture of the vehicle is in the unstable state is determined (S107), before the determination of the target brake torque by the brake control executer 140 (S108).

For the present purpose, among the driving information of the vehicle, the steering angle, the wheel slip ratio and the yaw rate are input to the brake control executer 140 to determine whether or not the posture of the vehicle is in the unstable state.

As one example of the determination as to whether or not the posture of the vehicle is in the unstable state (S107), upon confirming that the vehicle is turning or in a braking state during turning and confirming that an excessively high or low yaw rate compared to driver's steering intention occurs, it is determined that the posture of the vehicle is in the unstable state, and intervention into brake control, such as Operations S108 to S110, may be performed to secure vehicle stability.

For example, when an excessively high yaw rate occurs, brake torque may be generated in the opposite direction to the turning direction of the vehicle so that the posture of the vehicle may be controlled in a direction in which the yaw rate is decreased, and when an excessively low yaw rate occurs, brake torque may be generated in the turning direction of the vehicle so that the posture of the vehicle may be controlled in a direction in which the yaw rate is increased.

As another example of the determination as to whether or not the posture of the vehicle is in the unstable state (S107), upon confirming that an unintended yaw rate occurs while driving straight or in the braking state while driving straight, it is determined that the posture of the vehicle is in the unstable state, and intervention into brake control, such as Operations S108 to S110, may be performed to secure vehicle stability.

For example, when an unintended yaw rate occurs while driving straight, brake torque may be generated in the opposite direction to the direction of the yaw rate so that the posture of the vehicle may be controlled to enable the vehicle to be driven straight without occurring a yaw rate.

As yet another example of the determination as to whether or not the posture of the vehicle is in the unstable state (S107), upon confirming that a difference between the wheel speed and the vehicle speed is equal to or greater than a reference value while driving straight or in the braking state while driving straight, it is determined that the posture of the vehicle is in the unstable state, and intervention into brake control, such as Operations S108 to S110, may be performed to secure vehicle stability.

For example, when the vehicle speed is lower than the wheel speed, it is determined that the vehicle is in an unstable situation in which wheel spin occurs, and thus brake torque may be generated to suppress the wheel spin, and the brake torque may be applied in a wheel slip ratio region in which wheel-road grip force is maximized.

Accordingly, when it is determined that the posture of the vehicle is in the unstable state while driving or during braking, the metamodel 40 for friction coefficient prediction outputs the friction coefficient predicted by performing machine learning based on the derivative parameters in addition to the basic parameters, such as the rotation speed and the temperature of the brake disc and the hydraulic brake pressure, determines the target brake torque determined using the predicted friction coefficient, and reflects the determined target brake torque in an actual brake torque, being configured for accurately converging the actual brake torque on the target brake torque and thus improving accuracy in brake control and a response speed.

As is apparent from the above description, a system and method for upgrading a metamodel for friction coefficient prediction of a brake pad and a brake control system using the metamodel for friction coefficient prediction according to various exemplary embodiments of the present invention provide the following effects.

First, the metamodel for friction coefficient prediction is constructed through machine learning using various derivative parameters relating to the speed, temperature and pressure of a brake disc in addition to basic parameters, such as the speed, temperature and pressure of the brake disc, being configured for greatly improving performance and accuracy in friction coefficient prediction using the metamodel for friction coefficient prediction.

Second, because performance of the metamodel for friction coefficient prediction is upgraded using the derivative parameters in addition to the basic parameters, the size of prediction errors of the friction coefficient may be minimized, generation of abnormal behavior of a result of prediction of the friction coefficient may be minimized, and thus, the friction coefficient may be accurately estimated.

Third, by estimating an accurate friction coefficient, accuracy in evaluation of the driving performance of a vehicle may be improved through an increase in accuracy in determination of the brake torque of a brake system, and improvement of the actual performance of the brake system may be facilitated.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system of upgrading a metamodel for friction coefficient prediction of a brake pad, the system comprising:
    a data preprocessor configured to preprocess raw data including a rotation speed, a temperature and a pressure of a brake disc to validate the raw data;
    a derivative parameter preprocessor configured to generate derivative parameters from basic parameters, as output by the data preprocessor, including the rotation speed, the temperature and the pressure of the brake disc; and
    a metamodel processor configured to generate the metamodel for friction coefficient prediction by performing machine learning according to the derivative parameters output by the derivative parameter preprocessor,
    wherein the derivative parameter preprocessor is configured to define the derivative parameters as principal factors influencing a change in a friction coefficient by analyzing relations between the basic parameters and the friction coefficient at a point in time when a friction coefficient difference occurs under an identical condition of each of the basic parameters preprocessed by the data preprocessor.

2. The system claim 1, wherein the data preprocessor is configured to acquire valid data from the raw data by performing preprocessing of the raw data including classification of data stabilization sections for reliability of the raw data, removal of negative values and abnormal values deviating from a reference range, and removal of redundant data.

3. The system of claim 1, wherein the metamodel processor includes:
    a machine learning unit configured to perform the machine learning according to the derivative parameters generated by the derivative parameter preprocessor in addition to the basic parameters; and
    a friction coefficient training model constructed through the machine learning performed by the machine learning unit,
    wherein, when the machine learning according to the basic parameters and the derivative parameters is completed, the friction coefficient training model is generated as the metamodel for friction coefficient prediction.

4. The system of claim 1, wherein the metamodel for friction coefficient prediction includes the derivative parameter preprocessor configured to generate the derivative parameters from the basic parameters, and a machine learning unit configured to output a friction coefficient predicted by performing the machine learning according to the derivative parameters in addition to the basic parameters.

5. A brake control system using the metamodel for friction coefficient prediction of claim 1, the brake control system including:
the metamodel for friction coefficient prediction; and
a brake controller configured to determine a target brake torque according to a friction coefficient output by the metamodel for friction coefficient prediction and to apply a hydraulic brake pressure control signal corresponding to the determined target brake torque to a brake system.

6. The brake control system of claim 5, wherein the metamodel for friction coefficient prediction includes the derivative parameter preprocessor configured to generate the derivative parameters from the basic parameters, and a machine learning unit configured to output the friction coefficient predicted by performing the machine learning according to the derivative parameters in addition to the basic parameters.

7. The system of claim 1, wherein the derivative parameter preprocessor is configured to generate the derivative parameters defined through smoothing and lag processing in time series analysis of each of the parameters, among data analysis methods.

8. The system of claim 1, wherein the derivative parameters defined by the derivative parameter preprocessor include a moving average of the pressure of the brake disc, a moving average of the rotation speed of the brake disc, a moving average of the temperature of the brake disc, a square of the moving average of the temperature of the brake disc, a deceleration of the brake disc, a change in the temperature of the brake disc, a change in the temperature change of the brake disc, a change in the pressure of the brake disc, an estimated torque value using the deceleration, a correlation value between the estimated torque value and the temperature, kinetic energy of the brake disc, and cumulative kinetic energy of the brake disc.

9. A method of upgrading a metamodel for friction coefficient prediction of a brake pad, the method comprising:
preprocessing, by a data preprocessor, raw data including a rotation speed, a temperature and a pressure of a brake disc to validate the raw data;
generating, by a derivative parameter preprocessor, derivative parameters from basic parameters, as output by the data preprocessor, including the rotation speed, the temperature and the pressure of the brake disc; and
generating, by a machine learning processor, the metamodel for friction coefficient prediction by performing machine learning according to the derivative parameters output by the derivative parameter preprocessor,
wherein, in the generating of the derivative parameters, the derivative parameters are defined as principal factors influencing a change in a friction coefficient by analyzing relations between the basic parameters and the friction coefficient at a point in time when a friction coefficient difference occurs under an identical condition of each of the basic parameters preprocessed by the data preprocessor.

10. The method claim 9, wherein, in the preprocessing of the raw data, classification of data stabilization sections for reliability of the raw data, removal of negative values and abnormal values deviating from a reference range, and removal of redundant data are performed to acquire valid data from the raw data.

11. The method of claim 9, wherein the generating of the metamodel for friction coefficient prediction by performing the machine learning includes:
performing the machine learning according to the derivative parameters generated by the derivative parameter preprocessor in addition to the basic parameters; and
constructing a friction coefficient training model through the machine learning,
wherein, when the machine learning according to the basic parameters and the derivative parameters is completed, the friction coefficient training model is generated as the metamodel for friction coefficient prediction.

12. The method of claim 9, wherein the metamodel for friction coefficient prediction includes the derivative parameter preprocessor configured to generate the derivative parameters from the basic parameters, and a machine learning unit configured to output a friction coefficient predicted by performing the machine learning according to the derivative parameters in addition to the basic parameters.

13. The method of claim 9, wherein, in the generating of the derivative parameters, the derivative parameters defined through smoothing and lag processing in time series analysis of each of the parameters, among data analysis methods are generated.

14. The method of claim 9, wherein, in the generating of the derivative parameters, the generated derivative parameters include a moving average of the pressure of the brake disc, a moving average of the rotation speed of the brake disc, a moving average of the temperature of the brake disc, a square of the moving average of the temperature of the brake disc, a deceleration of the brake disc, a change in the temperature of the brake disc, a change in the temperature change of the brake disc, a change in the pressure of the brake disc, an estimated torque value using the deceleration, a correlation value between the estimated torque value and the temperature, kinetic energy of the brake disc, and cumulative kinetic energy of the brake disc.

15. A method of controlling a brake system, the method comprising:
preprocessing, by a data preprocessor, raw data including a rotation speed, a temperature and a pressure of a brake disc of the brake system to validate the raw data;
generating, by a derivative parameter preprocessor, derivative parameters from basic parameters, as output by the data preprocessor, including the rotation speed, the temperature and the pressure of the brake disc; and
generating, by a metamodel processor, a metamodel for friction coefficient prediction by performing machine learning according to the derivative parameters output by the derivative parameter preprocessor,
determining, by a brake controller, a target brake torque according to a friction coefficient output by the metamodel for friction coefficient prediction and applying a hydraulic brake pressure control signal corresponding to the determined target brake torque to the brake system,
wherein the derivative parameter preprocessor is configured to define the derivative parameters as principal factors influencing a change in a friction coefficient by analyzing relations between the basic parameters and the friction coefficient at a point in time when a friction coefficient difference occurs under an identical condition of each of the basic parameters preprocessed by the data preprocessor.

16. The method of claim 15, wherein, in the generating of the derivative parameters, the generated derivative parameters include a moving average of the pressure of the brake disc, a moving average of the rotation speed of the brake disc, a moving average of the temperature of the brake disc, a square of the moving average of the temperature of the brake disc, a deceleration of the brake disc, a change in the temperature of the brake disc, a change in the temperature change of the brake disc, a change in the pressure of the brake disc, an estimated torque value using the deceleration, a correlation value between the estimated torque value and the temperature, kinetic energy of the brake disc, and cumulative kinetic energy of the brake disc.

17. The method of claim 15, wherein the generating of the metamodel for friction coefficient prediction by performing the machine learning includes:

performing the machine learning according to the derivative parameters generated by the derivative parameter preprocessor in addition to the basic parameters; and constructing a friction coefficient training model through the machine learning, wherein, when the machine learning according to the basic parameters and the derivative parameters is completed, the friction coefficient training model is generated as the metamodel for friction coefficient prediction.

* * * * *